(12) United States Patent
Kusama

(10) Patent No.: US 7,703,764 B2
(45) Date of Patent: *Apr. 27, 2010

(54) INVERTING DOCUMENT FEEDING DEVICE WITH FLAP PORTION

(75) Inventor: Takuro Kusama, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/408,802

(22) Filed: Mar. 23, 2009

(65) Prior Publication Data

US 2009/0322010 A1   Dec. 31, 2009

(30) Foreign Application Priority Data

Jun. 25, 2008   (JP) .............................. 2008-165910

(51) Int. Cl.
*B65H 29/00* (2006.01)
(52) U.S. Cl. .................................................... 271/186
(58) Field of Classification Search ................ 271/185, 271/186, 163; 399/374
See application file for complete search history.

(56) References Cited

U.S. PATENT DOCUMENTS

| 5,430,536 A | 7/1995 | Fullerton et al. |
| 5,791,645 A * | 8/1998 | Takada .................. 271/3.03 |

FOREIGN PATENT DOCUMENTS

| JP | 07-175279 | 7/1995 |
| JP | 08-282897 | 10/1996 |
| JP | 08282897 A * | 10/1996 |
| JP | 08-310740 | 11/1996 |
| JP | 2001-106408 | 4/2001 |
| JP | 2006-232460 | 9/2006 |

* cited by examiner

*Primary Examiner*—Patrick H Mackey
*Assistant Examiner*—Gerald W McClain
(74) *Attorney, Agent, or Firm*—Banner & Witcoff, Ltd.

(57) ABSTRACT

A document feeding device includes a document placing tray, a document ejection tray disposed above the document placing tray, a feeding path, a first reversal path, a second reversal path, and a reversing mechanism. The document ejection tray has a flap portion capable of rocking up and down to provide a first ejection mode and a second ejection mode. The reversing mechanism is configured to temporarily eject part of a document to the document ejection tray.

6 Claims, 9 Drawing Sheets

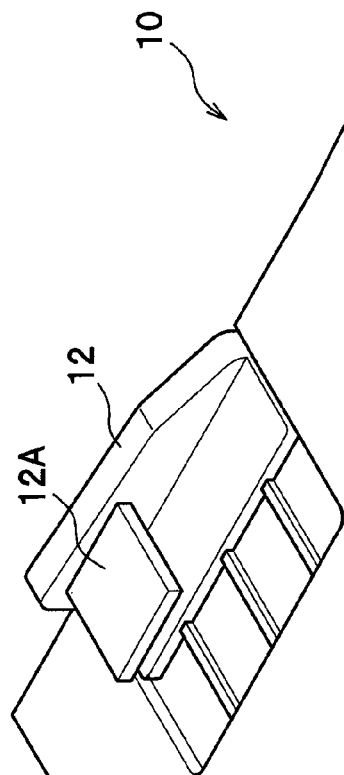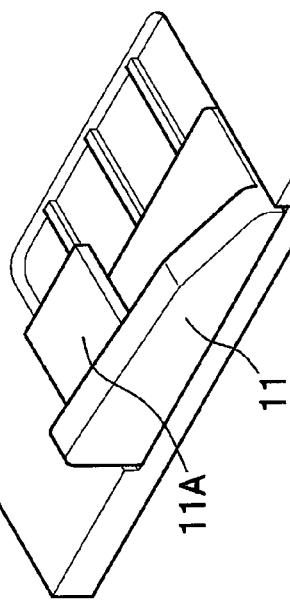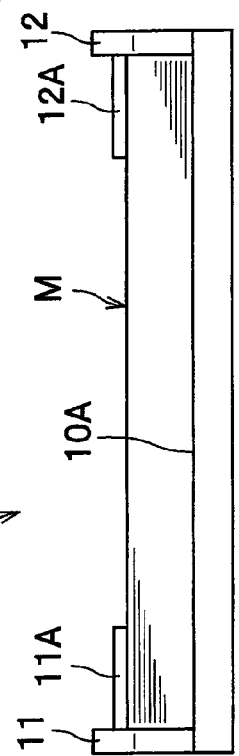
FIG. 2A
FIG. 2B

INVERTING DOCUMENT FEEDING DEVICE WITH FLAP PORTION

CROSS REFERENCE TO RELATED APPLICATION

The present disclosure relates to the subject matter contained in Japanese patent application No. 2008-165910 filed on Jun. 25, 2008, which is expressly incorporated herein by reference in its entirety.

TECHNICAL FIELD

The present invention relates to a document feeding device which allows double-sided reading of a document.

BACKGROUND ART

JP-A-8-310740 (see FIG. 1, U.S. Pat. No. 5,791,645) discloses a document feeding device having two document ejection trays. A document after double-sided reading is ejected to the document discharge tray arranged above a document placing tray. A document after single-sided reading is ejected to the other document ejection tray arranged opposite the document placing tray. JP-A-8-310740 (see FIG. 4, U.S. Pat. No. 5,791,645) also discloses a document feeding device, in which a document after single-sided reading is fed through a switchback path provided below a document ejection tray, curved upward and reversed by a tip (curved portion) of the document ejection tray, and ejected to an upper surface of the document ejection tray from the tip of the document ejection tray. These configurations can align the page order of ejected documents in the page order of documents placed on the document placing tray.

However, the aforementioned configurations have a problem in that the device is large in size. That is, the former configuration has to have two document ejection trays provided separately. Thus, the device is large mainly in a horizontal direction. In the latter configuration, the document ejection tray has to have an exclusive switchback path for reversing a document. Thus, the device is large mainly in the height direction.

In recent years, as an image forming apparatus, such as a facsimile machine or a copy machine, is made smaller in size, a document feeding device which allows double-sided reading is also required to be made smaller in size.

SUMMARY

The invention was made in view of the above-noted and other circumstances.

According to one of aspects of the invention, a document feeding device is provided, which includes a document placing tray, a document ejection tray disposed above the document placing tray, a feeding path, a first reversal path, a second reversal path, and a reversing mechanism. The document ejection tray has a flap portion capable of rocking up and down to provide a first ejection mode and a second ejection mode. The reversing mechanism is configured to temporarily eject part of a document to the document ejection tray.

According to the document feeding device, the document ejection tray has the flap portion which can be switched to the first ejection mode and the second ejection mode. Thus, the page number of documents to be ejected can be aligned at the time of any of single-sided reading and double-sided reading.

That is, for example, when the reading surface of a document ejected after single-sided reading is turned upward, documents are sequentially ejected in the second ejection mode such that a subsequently ejected document is inserted between a previously ejected document and the document ejection tray. For example, when the front reading surface of a document ejected after double-sided reading is turned downward, documents are sequentially in the first ejection mode such that a subsequently ejected document is stacked on a previously ejected document. Accordingly, the page order of documents to be ejected can be aligned.

Since the page order of documents can be aligned using the flap portion, it suffices that one document ejection tray is arranged, and the device can be made small in the horizontal direction compared with the configuration in which two document ejection trays are arranged.

The reversing mechanism can temporarily eject part of a document to the document ejection tray during switchback. Accordingly, the dimension of the document ejection tray in the height direction and the gap between the document placing tray and the document ejection tray can be made small compared with the configuration in which an exclusive switchback path is provided, and therefore the document feeding device can be made small in the height direction.

Accordingly, as one of advantages, this invention can provide a document feeding device capable of aligning page order of documents. As another one of the advantages, this invention can provide a document feeding device small in size. These and other advantages of this invention will be discussed in detail with reference to the accompanying drawings.

BRIEF DESCRIPTION OF THE DRAWINGS

FIG. 2A is a perspective view of a document placing tray and FIG. 2B is a drawing for explaining an number-of-documents limiting portion.

DESCRIPTION OF THE PREFERRED EMBODIMENT

Figure 3:
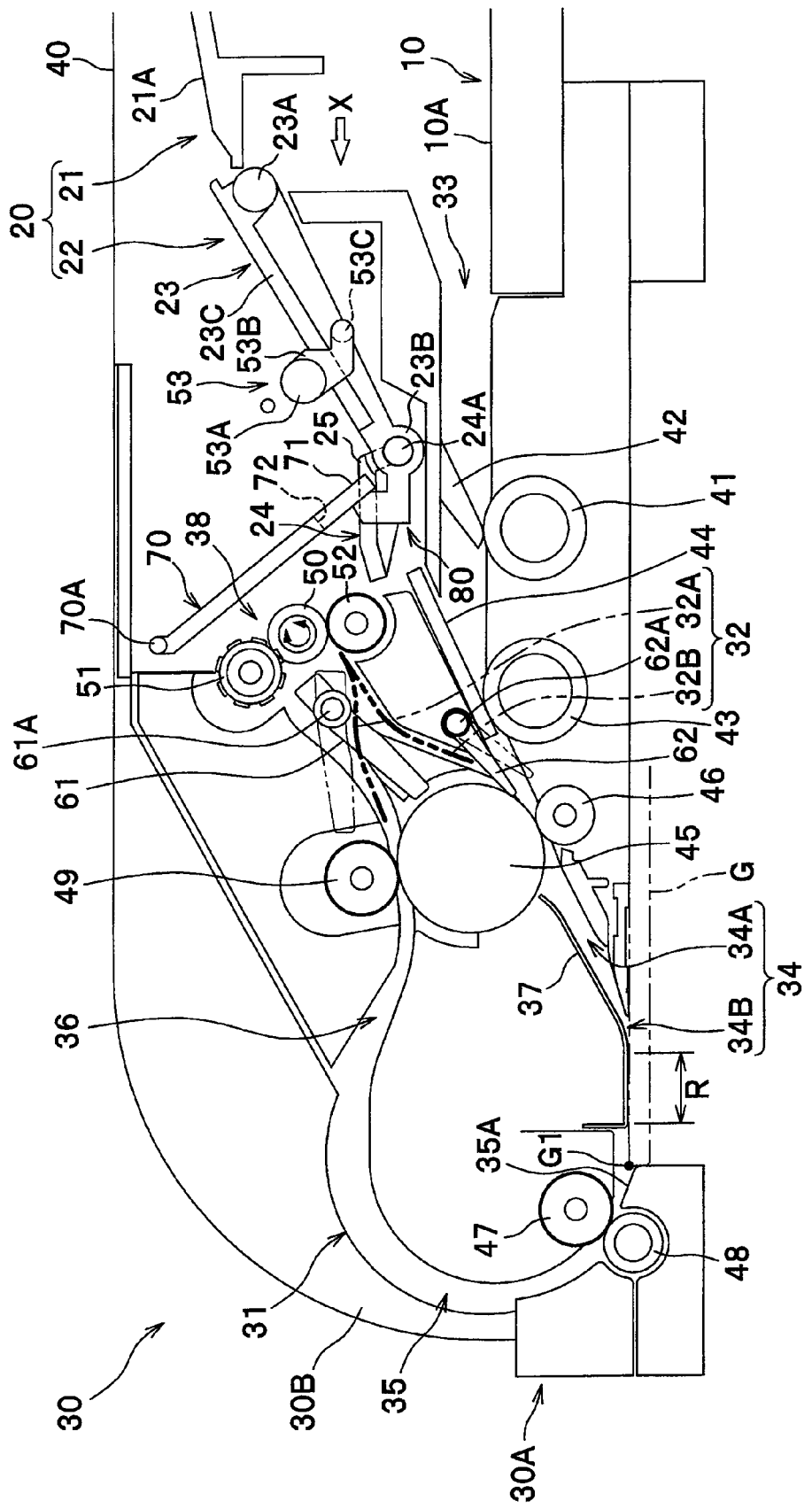
FIG. 3 is an enlarged view of the document feeding unit.
Figure 4:
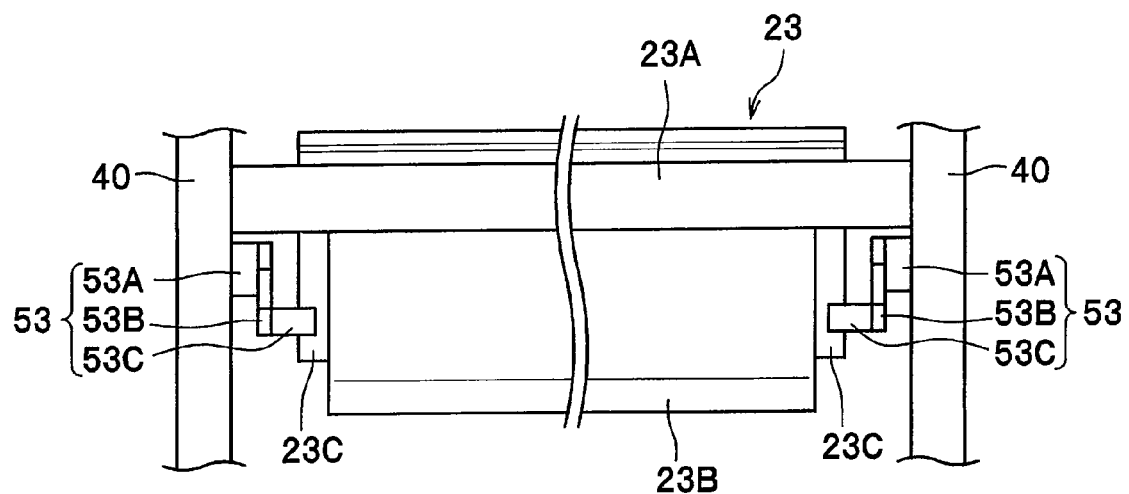
FIG. 4 is a drawing when a flap portion and cams are observed in the direction of an arrow X of FIG. 3.
Figure 5:
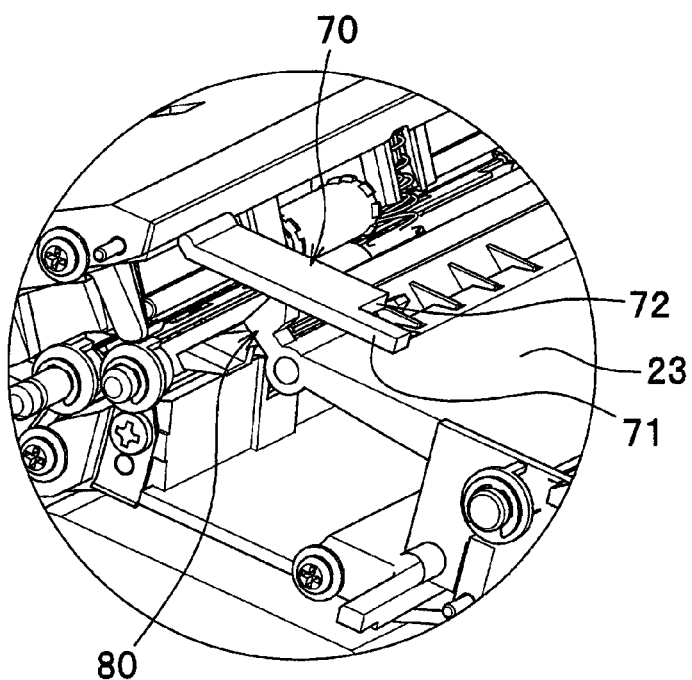
FIG. 5 is a perspective view of a hold-down member and a push-up member.

Next, preferred embodiments of the invention will be described in detail appropriately referring to the accompanying drawings. In the drawings to be referred to, FIG. 1 is a view showing the entire configuration of a document feeding device, FIG. 2A is a perspective view of a document placing tray, FIG. 2B is a view for explaining an operation of a number-of-documents limiting portion, FIG. 3 is an enlarged view of a document feeding unit, FIG. 4 is a view when a flap portion and a cam is observed in the direction of an arrow X of FIG. 3, and FIG. 5 is a perspective view of a hold-down member and a push-up member.

Here, in the following description, a "feeding direction" is defined as a direction (a direction indicated by the arrow of FIG. 1) in which a document is fed toward a document ejection tray 20 along a feeding path 31 (and a second reversal path 32B, FIG. 7), and an "ejection direction" is defined as a direction (a direction from the left toward the right of FIG. 1) in which a document is ejected along the document ejection tray 20. Additionally, the upstream and downstream in the feeding direction and a feeding-out direction may be simply referred to as "upstream" and "downstream", respectively. Moreover, a width direction (a direction of a reader side or a side away from the reader with respect to the sheet plane of FIG. 1) orthogonal to the feeding direction and ejection direction of a document is simply referred to as "width direction."

Figure 1:
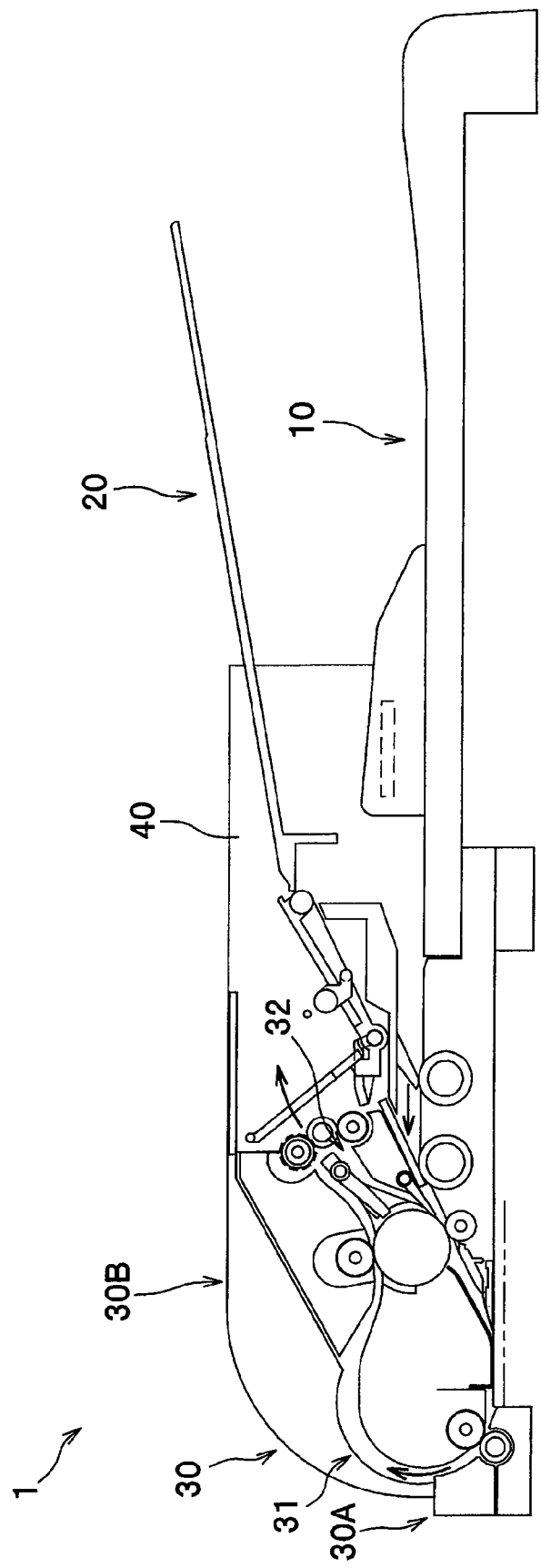
FIG. 1 is a drawing showing the entire configuration of a document feeding device according to an embodiment of invention.

As shown in FIG. 1, the document feeding device 1 mainly includes a document placing tray 10, a document ejection tray 20, and a document feeding unit 30.

<Configuration of Document Placing Tray>

The document placing tray 10 is a portion on which a document to be read (to be fed) is placed, and is provided at a right lower portion of the document feeding device 1 as shown in FIG. 1. As shown in FIG. 2A, the document placing tray 10 has a pair of document guides 11 and 12 which erect from a placing surface 10A and which faces each other in the width direction.

The document guides 11 and 12 restrict the position, in the width direction, of a document M placed on the placing surface 10A. When the document guide 11 (or 12) is slidingly moved in the width direction, the document guide 12 (or 11) interlocked therewith by an interlocking mechanism is also slidingly moved in the width direction oppositely to the document guide 11 (or 12).

The document guides 11 and 12 are provided with number-of-documents limiting portions 11A and 12A which extend inward in the width direction. The number-of-documents limiting portions 11A and 12A, as shown in FIG. 2B, are configured to prevent documents M from being placed on the document placing tray 10 beyond the number-of-documents limiting portions 11A and 12A This way, the number of documents M to be placed on the document placing tray 10 is limited.

Specifically, the number of documents M to be placed on the document placing tray 10 is less than or equal to a maximum number of documents, which is determined such that a document temporarily ejected to the document ejection tray 20 by a reversing mechanism (described later) does not interfere with documents already ejected on the document ejection tray 20. Here, the "interfere" means that a document temporarily ejected by the reversing mechanism abuts against trailing ends of documents (a stack of documents) already ejected.

For example, if a leading end of a document temporarily ejected to the document ejection tray 20 during switchback abuts against trailing ends of already ejected documents when the number of the already ejected documents exceeds thirty, the maximum number of documents which do not cause interference is thirty. Accordingly, in this case, the number-of-documents limiting portions 11A and 12A are arranged such that the distance between a lower surface of each limiting portion 11A, 12A and the placing surface 10A is less than or equal to the thickness of thirty documents (maximum number of documents which do not cause interference).

<Configuration of Document Ejection Tray>

As shown in FIG. 1, the document ejection tray 20 is a portion onto which a document (from which an image has been already read) is ejected and placed. The document ejection tray 20 is disposed above the document placing tray 10. As shown in FIG. 3, the document ejection tray 20 includes a tray portion 21 and a flap portion 22 disposed upstream of the tray portion 21.

The tray portion 21 is arranged above the document placing tray 10. An upstream portion of the tray portion 21 is fixed to side panels 40 at both sides in the width direction. An upper surface of the tray portion 21 serves as a stacking surface 21A to which a document is ejected. In addition, the side panels 40 are panel-shaped members which are arranged at both sides in the width direction and which constitute, in combination with a main frame 30A and a cover 30B, an outer frame (housing) of the document feeding device 1.

The flap portion 22 includes a first flap 23, and a second flap 24.

The first flap 23 is rockable up and down with respect to the tray portion 21 about a rocking shaft 23A provided at a downstream end thereof, and an upstream end of the first flap 23 is formed with a bearing portion 23B. As shown in FIGS. 3 and 4, abutting portion 23 protrude outwardly in the width direction from upper portions of side faces so that cams 53 (push-up portions 53C) abut against the abutting portions 23C.

The second flap 24 is arranged upstream of the first flap 23, and is rockable with respect to the first flap 23 about a rocking shaft 24A which is received in the bearing portion 23B of the first flap 23. The second flap 24 is maintained in a state where it is bent with respect to the first flap 23 such that its upper surface becomes substantially horizontal, when the flap portion 22 is located at a rock-down position shown in FIG. 3. In linking with the upward rocking of the flap portion 22 (first flap 23), an upstream end 24B of the second flap 24 rocks downward about the rocking shaft 24A (see FIG. 11). The second flap 24 has a curved portion 25 which is bent obliquely downward from a downstream end of an upper surface of the second flap 24.

Here, the configuration of the cams 53 for rocking the flap portion 22 up and down will be described.

As shown in FIG. 4, the cams 53 are arranged at both sides of the first flap 23 in the width direction, and each cam is integrally comprised of a shaft portion 53A, a connecting portion 53B, and a push-up portion 53C. The shaft portion 53A is provided in the side panel 40 so as to be rotatable forwardly and reversely, and is rotationally driven by a driving force transmitted thereto from a motor (not shown). The connecting portion 53B connects the shaft portion 53A to the push-up portion 53C, and is arranged substantially parallel to the side panel 40. The push-up portion 53C is a substantially cylindrical portion which extends inward in the width direction from one end of the connecting portion 53B.

<Configuration of Document Feeding Unit>

As shown in FIG. 1, the document feeding unit 30 is configured to feed a document from the document placing tray 10 to the document ejection tray 20, and is disposed at the left side of the document placing tray 10 and the document ejection tray 20. The document feeding unit 30 has the outer frame mainly comprised of the main frame 30A and the cover 30B. The cover 30B is coupled to the main frame 30A to be rotatable about a left lower portion thereof in FIG. 1.

The feeding path 31 and the reversal path 32 are formed mainly by the main frame 30A and the cover 30B in the document feeding unit 30. The feeding path 31 is provided with a feeding mechanism for feeding a document, and the reversal path 32 is provided with a reversing mechanism for switching back a document. Hereinafter, detailed configurations of them will be described.

[Configuration of Feeding Path and Feeding Mechanism]

As shown in FIG. 3, the feeding path 31 is a path along which a document is guided to the document ejection tray 20 via a reading position R from the document placing tray 10, and is formed in a substantial U-shape. The feeding path 31 is comprised of a inlet path 33, a lower feeding path 34, a curved path 35, and an upper feeding path 36.

The inlet path 33 extends substantially horizontally toward the downstream from the placing surface 10A of the document placing tray 10, and upper and lower guide surfaces of the inlet path 33 are formed by the main frame 30A.

The lower feeding path 34 is mainly comprised of an inclined portion 34A which extends obliquely downward from a downstream end of the inlet path 33, and a horizontal portion 34B which extends substantially horizontally toward the downstream from a downstream end of the inclined portion 34A. In the lower feeding path 34, a lower guide surface of the inclined portion 34A is formed by the main frame 30A, and upper guide surfaces of the inclined portion 34A and the horizontal portion 34B are formed by a document guide member 37. A lower side of the horizontal portion 34B is exposed so that this portion serves as the reading position R.

The document guide member 37 has mainly an inclined portion and a horizontal portion (reference numerals thereof are omitted) corresponding to the lower feeding path 34, and the horizontal portion holds down a document exposed to the outside of the document feeding unit 30 at the reading position R. A platen glass G of a document reading device is arranged below the horizontal portion of the document guide member 37. When a document is fed through the horizontal portion 34B while being held between the document guide member 37 and the platen glass G, an image on the document is read by an image sensor (not shown) of the document reading device at the reading position R.

The curved path 35 extends in an arcuate shape upward from a downstream end of the lower feeding path 34 (horizontal portion 34B) to curve the feeding direction from the left to the right of FIG. 3. Guide surfaces of the curved path 35 are formed by the main frame 30A and the cover 30B. Although not illustrated, when the cover 30B is rotated to be open, a portion of the curved path 35 is exposed to the outside, and therefore a document jamming in the feeding path 31 can be removed from the exposed portion.

A guide surface 35A is formed at a lower surface of an upstream end of the curved path 35. The guide surface 35A inclines from a position, lower than an upper end G1 of a downstream end of the platen glass G, toward a nip position between a second feeding roller 47 and a pinch roller 48. Accordingly, a document which has been fed on the platen glass G is fed to the curved path 35 without being caught.

The upper feeding path 36 extends toward the document ejection tray 20 from a downstream end of the curved path 35. In the upper feeding path 36, an upper guide surface is formed by the main frame 30A, and a lower guide surface is formed by the main frame 30A and an upper surface of a first guide member 61. The downstream end of the upper feeding path 36 serves as a document ejection port 38.

A feeding mechanism is mainly comprised of a feed-in roller 41, a feed-in pad 42, a separating roller 43, a separating pad 44, a first feeding roller 45, a second feeding roller 47, a switchback roller 50 and pinch rollers 46, 48, 49 and 51.

The feed-in roller 41 is configured to move a document or documents placed on the document placing tray 10 toward the separating roller 43. The feed-in roller 41 is arranged such that its upper portion is exposed substantially at the middle, lower side of the inlet path 33, and is rotationally driven by a driving force transmitted thereto from a motor (not shown).

The feed-in pad 42 pushes a document against the feed-in roller 41 to feed the document reliably, and is located above the feed-in roller 41 to face the feed-in roller 41. The feed-in pad 42 is rockable up and down, and is biased toward the feed-in roller 41.

The separating roller 43 is configured to separate a document one by one and feed the document toward the reading position R. The separation roller 43 is arranged such that its upper portion is exposed at the lower side of a downstream end of the inlet path 33, and is rotationally driven by a driving force transmitted thereto from a motor (not shown).

The separation pad 44 pushes a document against the separation roller 43 to reliably separate and feed the document one by one, and is arranged above the separation roller 43 to face the separation roller 43. The separation pad 44 is rockable up and down, and is biased toward the separation roller 43.

The first feeding roller 45 is configured to feed a document toward the reading position R and the outside. The first feeding roller 45 is arranged such that its lower portion is exposed to the lower feeding path 34 substantially at the middle, upper side of the inclined portion 34A and its upper portion is exposed to the upper feeding path 36 at the middle, lower side of the upper feeding path 36. The first feeding roller 45 is rotationally driven by a driving force transmitted thereto from a motor (not shown).

The pinch roller 46 is arranged such that its upper portion abuts against the first feeding roller 45 at the middle, lower side of the inclined portion 34A.

The second feeding roller 47 is configured to feed a document to the document ejection tray 20 from the reading position R. The second feeding roller 47 is arranged such that its lower portion is exposed to the upper side of an upstream end of the curved path 35, and is rotationally driven by a driving force transmitted thereto from a motor (not shown).

The pinch roller 48 is arranged such that its upper portion abuts against the second feeding roller 47 at the lower side of the upstream end of the curved path 35.

The pinch roller 49 is arranged such that its lower portion abuts against the first feeding roller 45 at the middle, upper side of the upper feeding path 36.

The switchback roller 50 is rotated clockwise in FIG. 3 to eject a document (document from which an image has been read) to the document ejection tray 20 from a nip position between the switchback roller 50 and the pinch roller 51. The switchback roller 50 is arranged at an downstream end (document ejection port 38) of the upper feeding path 36. The switchback roller 50 is rotationally driven by a driving force transmitted thereto from a motor (not shown).

The pinch roller 51 is arranged above the switchback roller 50 to abut against the switchback roller 50.

The switchback roller 50 and the pinch roller 51 serves as a pair of ejection rollers.

In addition, the pinch rollers 46, 48, 49 and 51 are respectively biased toward the rollers 45, 47, 45 and 50 by biasing members (not shown) to push a document against the rollers 45, 47, 45 and 50. Accordingly, a document can be fed reliably.

[Configuration of Reversal Path and Reversing Mechanism]

The reversal path 32 is comprised of a first reversal path 32A along which a portion of a document is guided to the outside for switchback, and a second reversal path 32B along which the document is guided again to the reading position R after the switchback.

The first reversal path 32A branches from the feeding path 31 at a position (in the vicinity of the downstream end of the upper feeding path 36) downstream of the reading position R, and extends toward the outside (right of FIG. 3). An upper guide surface of the first reversal path 32A is formed by a lower surface of the first guide member 61 (see a chain line of FIG. 3). A lower guide surface of the first reversal path 32A is formed by the main frame 30A.

The second reversal path 32B extends obliquely downward from the first reversal path 32A, and is connected to the upstream side of the reading position R, specifically, an upstream end of the lower feeding path 34 (inclined portion 34A). An upper guide surface of the second reversal path 32B is formed by the main frame 30A, and a lower guide surface of the second reversal path 32B is formed by the main frame 30A and an upper surface of the second guide member 62) see chain line of FIG. 3).

The first guide member 61 is configured to switch a path along which a document is fed. The first guide member 61 is arranged upstream of the switchback roller 50 (substantially left in FIG. 3). The first guide member 61 is rockable up and down about the rocking shaft 61A. When the first guide member has rocked downward (see the solid line of FIG. 3), the first guide member forms the lower guide surface of the upper feeding path 36, and guides a document to the outside from the feeding path 31 (the downstream end of the upper feeding path 36). When the first guide member has rocked upward (see the chain line of FIG. 3), the first guide member forms the upper guide surface of the first reversal path 32A, and guides a document to the first reversal path 32A.

The second guide member 62 is configured to selectively connect the lower feeding path 34 to one of the inlet path 33 and the second reversal path 32B. The second guide member 62 is disposed at a join portion between the lower feeding path 34 and the second reversal path 32B. The second guide member 62 is rockable up and down about the rocking shaft 62A. When the second guide member has rocked upward (see the solid line of FIG. 3), the second guide member 62 connects the inlet path 33 to the lower feeding path 34. When the second guide member 62 has rocked downward (see the chain line of FIG. 3), the second guide member 62 connects the second reversal path 32B to the lower feeding path 34. The presence of the second guide member 62 can eliminate an erroneous feeding, such that a document having a curled leading end may enter from the inlet path 33 into the second reversal path 32B or from the second reversal path 32B into the inlet path 33.

In this embodiment, the reversing mechanism includes the switchback roller 50 and the pinch roller 52 which are arranged at a downstream end of the first reversal path 32A.

The switchback roller 50 is rotatable forwardly and reversely, and its rotational direction is controlled by a control device (not shown) for switchback. In detail, the switchback roller rotates counterclockwise in FIG. 3 to eject (feeds) a document held between the switchback roller and the pinch roller 52 to the outside. Before a document is ejected completely, the switchback roller 50 is stopped temporarily by the control device, and then is rotated clockwise in FIG. 3 to pull in the document held between the switchback roller 50 and the pinch roller 52. At this time, since the first guide member 61 rocks downward (see the chain line of FIG. 3), the pulled-in document is guided to the second reversal path 32B along the lower surface of the first guide member 61.

The pinch roller 52 is arranged above the switchback roller 50 to abut against the switchback roller 50. Since the pinch roller 52 is biased toward the switchback roller 50, a document can be pushed against the switchback roller 50. Accordingly, a document can be fed reliably.

In the document feeding unit 30 of this embodiment, the first reversal path 32A is arranged such that the nip position between the switchback roller 50 and the pinch roller 52 is located above an upstream end (the upstream end 24B of the second flap 24, see FIG. 9) of the flap portion 22 in the rock-down position.

Additionally, the length of a path along which a document is fed from the reversing mechanism to the pair of ejection rollers is made smaller than the length of a document of A4 size (length of a document in the feeding direction or ejection direction). In detail, the length from the nip position between the switchback roller 50 and the pinch roller 52 through the first reversal path 32A, the second reversal path 32B, the lower feeding path 34, the curved path 35, and the upper feeding path 36 to the nip position between the switchback roller 50 and the pinch roller 51 is made smaller than the length of a document of A4 size (see FIG. 8).

<Configuration of Hold-Down Member and Withdrawal Mechanism>

The document feeding device 1 includes a hold-down members 70 and a withdrawal mechanism in addition to the document placing tray 10, the document ejection tray 20, and the document feeding unit 30. Each hold-down member 70 is configured to hold down a trailing end of a document which has been ejected to the document ejection tray 20 when the flap portion 22 rocks downward (see FIG. 3). The withdrawal mechanism is configured to withdraw the hold-down members 70 when the flap portion 22 rocks upward (see FIG. 12).

The withdrawal mechanism, as shown in FIG. 3, is mainly comprised of cams 53, the flap portion 22, and push-up members 80.

Each push-up member 80 is configured to push up a respective one of the hold-down members 70 when the flap portion 22 rocks upward. The push-up member 80 extends toward the upstream from the bearing 23B of the first flap 23 and then curved upward to present a substantially L-shape. In more detail, as shown in FIG. 5, two push-up members (one push-up member is shown in FIG. 5) 5 are respectively disposed on both sides of the first flap 23 in the width direction to be located outside the width of a document. Each push-up member 80 has a tip formed substantially in a chevron shape, and is adapted to support the hold-down member 70 in a withdrawal position by its upstream inclined surface when the flap portion 22 is in the rock-up position.

Although one hold-down member 70 is shown in FIG. 3, two hold-down members 70 are respectively disposed above the flap portion 22 correspondingly to the push-up members 80 to be located at both sides of a document in the width direction. The tip of the hold-down member 70 is rockable up and down about the rocking shaft 70A provided above the pinch roller 51. As shown in FIG. 5, the hold-down member 70 has such an elongating plate shape that an inner side portion (in the width direction) of its tip is notched in a rectangular form. The outer side portion (in the width direction) of the hold-down member 70 serves as a pressed portion 71 to be pushed up by the push-up member 80, and an end of the notched inner side portion of the hold-down member 70 serves as a document abutting portion 72.

The pressed portion 71 is located outside the width of a document, and rocks downward by its own weight to abut against the downstream inclined surface of the tip of the push-up member 80 when the flap portion 22 is in the rock-down position as shown in FIG. 3. The document abutting portion 72 faces the upper surface of the document ejection tray 20 (second flap 24) when the flap portion 22 is in the rock-down position as shown in FIG. 3.

<Operation at Double-Side Reading>

The operation of the document feeding device 1 configured as described above will be described.

Figure 6:
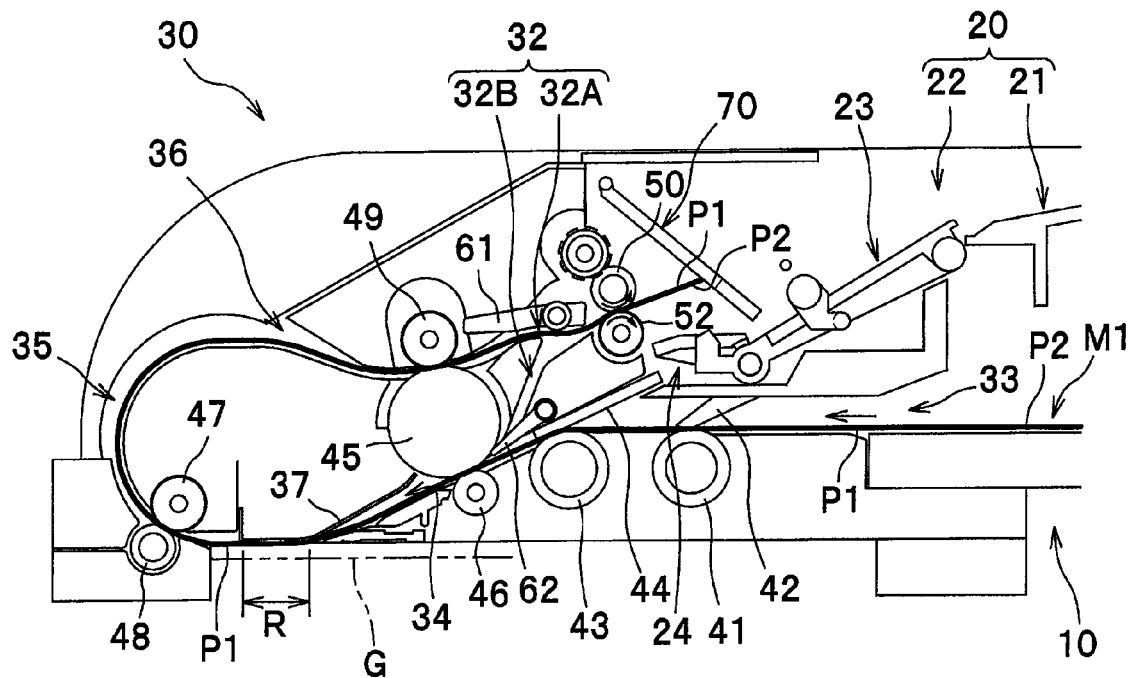
FIG. 6 is a drawing for explaining the operation for double-side reading.
Figure 7:
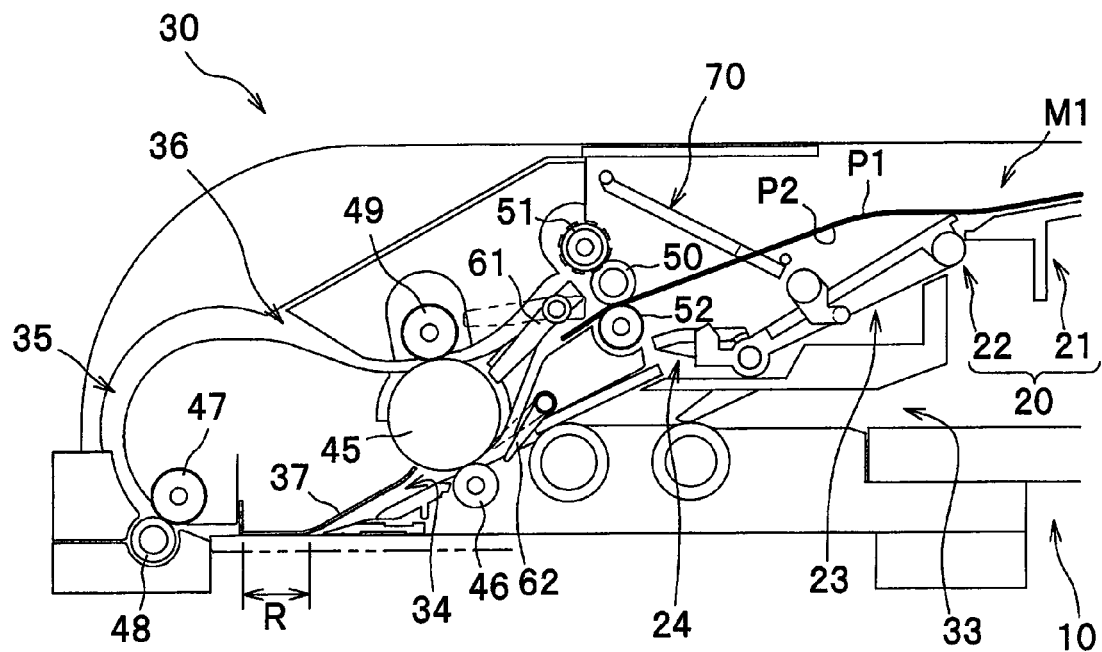
FIG. 7 is a drawing for explaining the operation for double-side reading.
Figure 8:
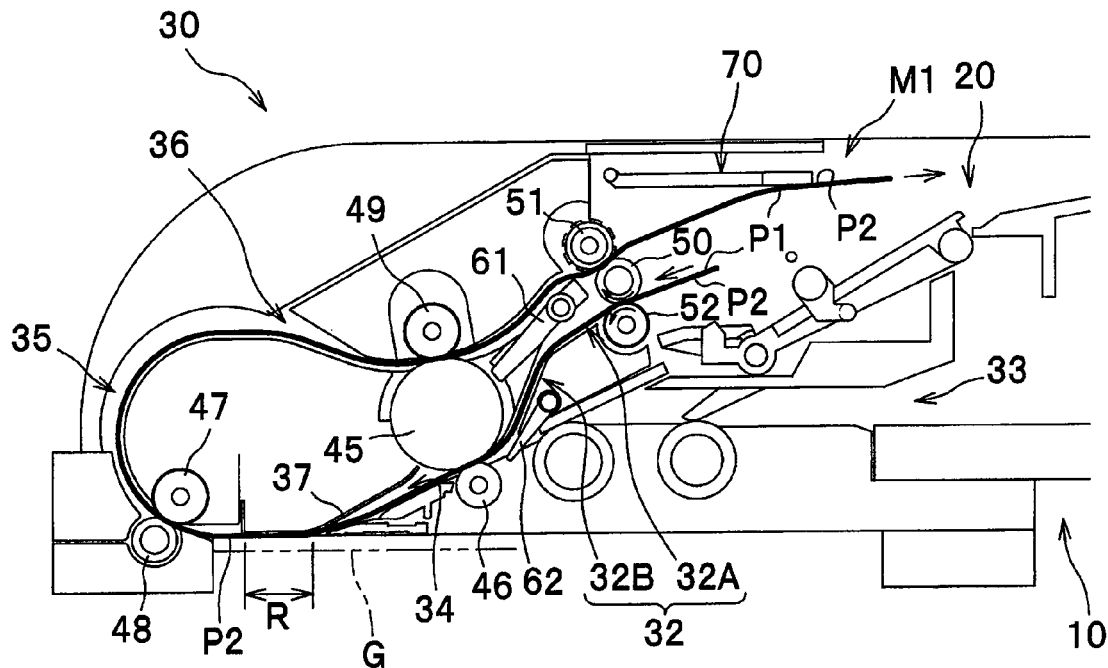
FIG. 8 is a drawing for explaining the operation for double-side reading.
Figure 9:
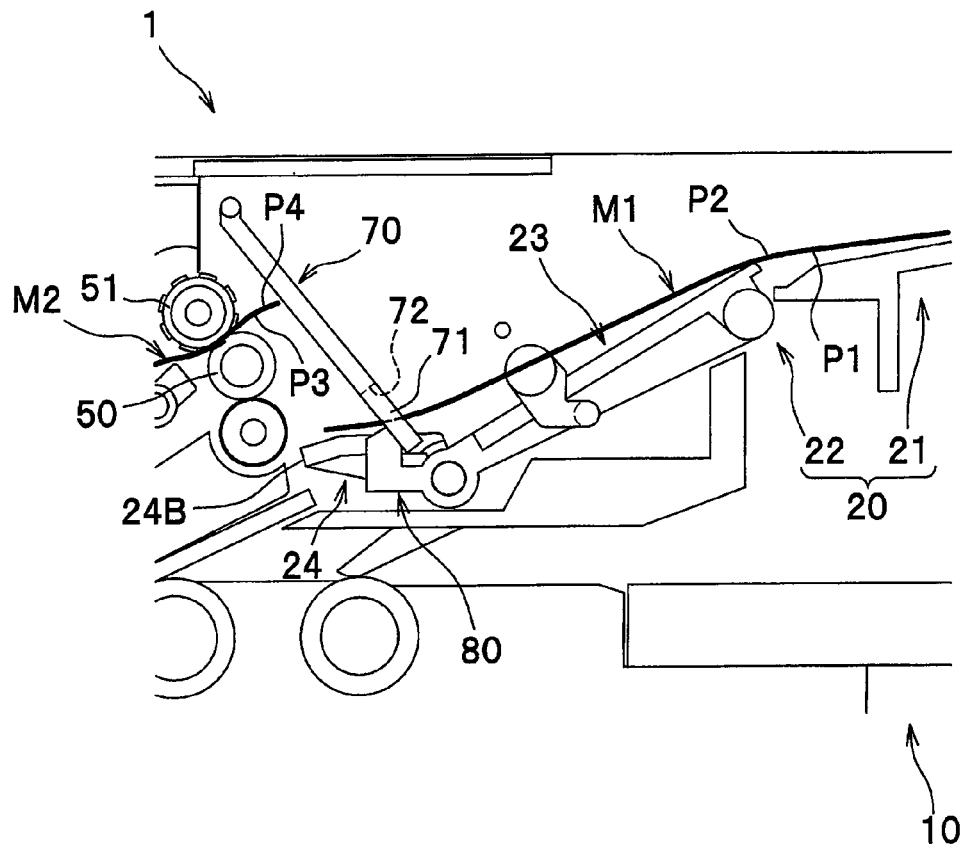
FIG. 9 is a drawing for explaining the operation in a first ejection mode.

First, the operation for double-side reading will be described. FIGS. 6 to 8 are drawings for explaining the operation for double-side reading, and FIG. 9 is a drawing for explaining the operation in a first ejection mode.

For double-side reading, as shown FIG. 6, the flap portion 22 is in a downwardly rocked state (that is, the flap portion 22 is located at the rock-down position). Additionally, before start of reading, the guide member 61 is located at a rock-up position to form the first reversal path 32A, and the second guide member 62 is located at a rock-up position to connect the inlet path 33 to the lower feeding path 34.

In this state, first, a document M1 of A4 size is placed on the document placing tray 10 with its front reading surface P1 turned downward and its back reading surface P2 turned upward.

When reading is started, the document M1 is moved to the separating roller 43 by the feed-in roller 41 and the feed-in pad 42, and is further fed to the lower feeding path 34 from the inlet path 33 by the separating roller 43 and the separating pad 44.

The document M1 which has been fed to the lower feeding path 34 is fed to the reading position R with the reading surface P1 turned downward by the first feeding roller 45 and the pinch roller 46, and the reading surface P1 is read at the reading position R. Thereafter, the document M1 is fed along the curved path 35 and upper feeding path 36 by the rollers 47, 48, 45 and 49, and is fed through the first reversal path 32A below the first guide member 61 to the nip position between the switchback roller 50 and the pinch roller 52.

As mentioned above, the first reversal path 32A is arranged such that the nip position between the switchback roller 50 and the pinch roller 52 is located above the upstream end of the flap portion 22 (second flap 24) which has rocked downward. Accordingly, the document M1 is first ejected to the second flap 24 from the nip position between the switchback roller 50 which is rotationally driven counterclockwise in FIG. 6, and the pinch roller 52 which is rotated to follow the rotation of the switchback roller 50, and as shown in FIG. 7, is then ejected to the first flap 23 and the tray portion 21. That is, the document M1 is ejected to the document ejection tray 20.

Then, the rotation of the switchback roller 50 is stopped by the control device (not shown) before all of the document M1 is ejected from the nip position between the switchback roller 50 and the pinch roller 52. Accordingly, the document M1 is in a pinched state (a state where the document M1 is partly ejected to the document ejection tray 20) between the switchback roller 50 and the pinch roller 52, with its front reading surface P1 turned upward and its back reading surface P2 turned downward. In this state, the guide member 61 rocks downward to switch a path along which the document M1 is to be fed, and the second guide member 62 rocks downward to connect the second reversal path 32B to the lower feeding path 34.

Thereafter, as shown in FIG. 8, as the switchback roller 50 is rotated clockwise in FIG. 8, the document M1 is pulled back to the first reversal path 32A by the switchback roller 50 and the pinch roller 52, is fed to second reversal path 32B along the lower surface of the first guide member 61, and is fed to the upstream end (upstream of the reading position R) of the lower feeding path 34.

The document M1 which has been fed again to the lower feeding path 34 is fed to the reading position R with the reading surface P2 turned downward by the first feeding roller 45 and the pinch roller 46, and the reading surface P2 is read at the reading position R. Thereafter, the document M1 is fed along the curved path 35 and the upper feeding path 36 (above the first guide member 61) to the nip position between the switchback roller 50 and the pinch roller 51 by the rollers 47, 48, 45 and 49. Then, the document M1 is ejected to the document ejection tray 20 from the nip position between the switchback roller 50 and the pinch roller 51, with its front reading surface P1 turned downward and its back reading surface P2 turned upward.

As shown in FIG. 9, the upstream end 24B of the second flap 24 is located below the nip position between the switchback roller 50 and the pinch roller 51 in a state where the flap portion 22 has rocked downward. Therefore, the read document M1 is ejected to the document ejection tray 20 such that the trailing end (rear end) of the read document M1 is located below the nip position between the switchback roller 50 and the pinch roller 51. Accordingly, a next document M2 both sides (reading surfaces P3 and P4) of which has been read is ejected from the nip position between the switchback roller 50 and the pinch roller 51 to be stacked on the previously ejected document M1.

That is, when the flap portion 22 is located at the rock-down position, the document feeding device 1 can sequentially eject documents in a first ejection mode where a document M1 is ejected onto the document ejection tray 20 and then a subsequent document M2 is ejected to be stacked on the ejected document M1 on the document ejection tray 20. Since the document M1 is ejected with its front reading surface P1 turned downward and its back reading surface P2 turned upward and the document M2 is ejected with its reading surface P3 turned downward and its back reading surface P4 turned upward, the page number of the documents can be aligned in order of P1, P2, P3, and P4 from below. This page order is the same as page order of the documents M1 and M2 placed on the document placing tray 10.

Since the tip of the hold-down member 70 rocks downward when the flap portion 22 is in the rock-down position, the trailing end of the document M1 which has been ejected to the document ejection tray 20 is located between the upper surface of the second flap 24 and the document abutting portion 72 of the hold-down member 70. Therefore, even if the trailing end of the document M1 is curled upward, the hold-down member 70 (document abutting portion 72) abuts against the trailing end of the document M1 to push the trailing end of the document M1. Accordingly, the trailing end of the document M1 is surely located below the nip position between the switchback roller 50 and the pinch roller 51.

Accordingly, a leading end of a document M2 subsequently ejected after reading or a leading end of a document M2 during switchback can be prevented from interfering with a trailing end of a document M1 on the document ejection tray 20 even if the trailing end of the document M1 is curled upward. As a result, bending of the document M2 subsequently ejected, or paper jamming caused by the bending can be suppressed. Further, it is possible to eliminate a case in which the document M2 subsequently ejected after reading is erroneously inserted under the document M1, thereby keeping page order properly.

In addition, this effect is exhibited even when a plurality of documents are stacked on the document ejection tray 20 and the hold-down member 70 abuts against (contacts with) an uppermost document. Additionally, the hold-down member 70 is provided such that its tip is rockable up and down, and therefore even if a leading end of a document after reading or during switchback abuts against the hold-down member 70, the hold-down member 70 is pushed by the leading end of the document to rock toward the downstream (see FIGS. 6 to 8). Accordingly, the document is ejected (switched back) well.

<Switching of Ejection Mode and Withdrawal of Hold-Down Member>

Figure 10:
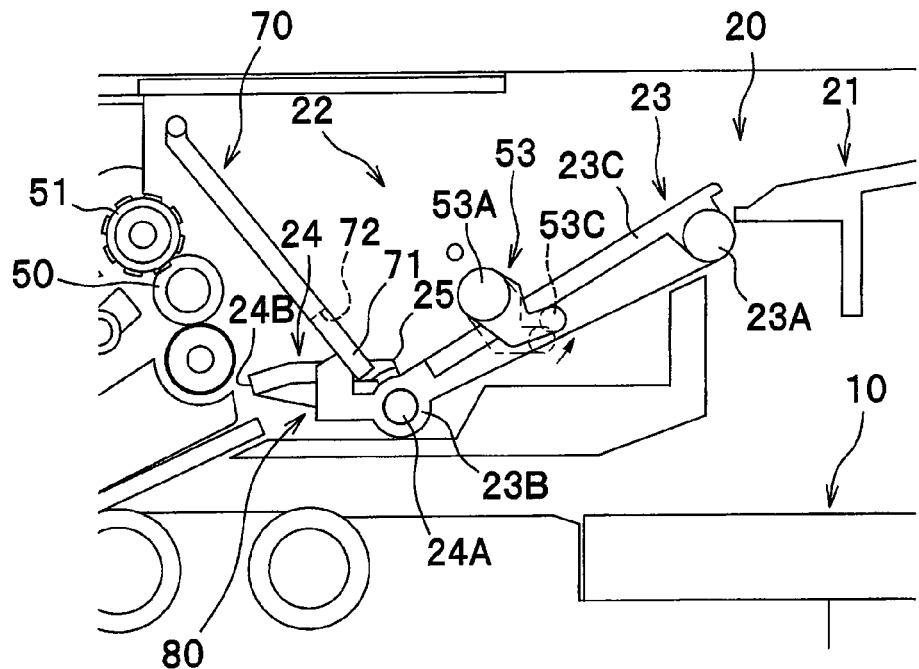
FIG. 10 is a drawing for explaining the operation of the cams and the flap portion.
Figure 11:
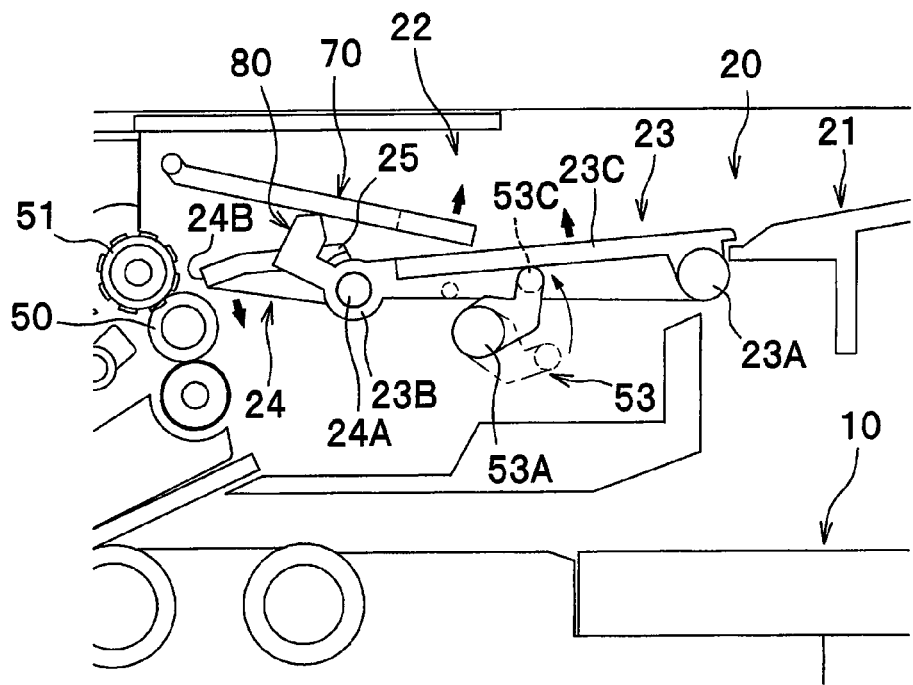
FIG. 11 is a drawing for explaining the operation of the cams and the flap portion.
Figure 12:
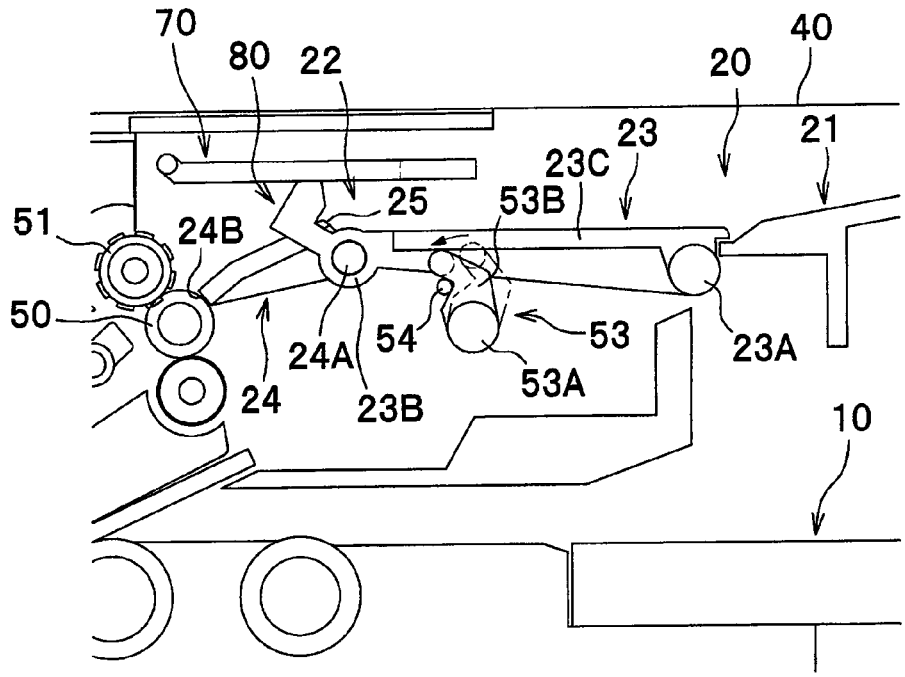
FIG. 12 is a drawing for explaining the operation of the cams and the flap portion.

Next, the operation of the cam 53, the flap portion 22 and the hold-down member 70 will be described. FIGS. 10 to 12 are drawings for explaining the operation of the cam, the flap portion and the hold-down member.

As shown in FIG. 10, when a driving force is transmitted from a motor (not shown) to rotate the shaft portion 53A of the cam 53 counterclockwise in FIG. 10, the push-up portion 53C is rotated upward about the shaft portion 53A to abut against the lower surface of the abutting portion 23C of the first flap 23.

As shown in FIG. 11, when the push-up portion 53C is further rotated upward, the abutting portion 23C is pushed upward, and the flap portion 22 (first flap 23) rocks upward about the rocking shaft 23A. In linking with the upward rocking of the first flap 23, the upstream end 24B of the second flap 24 rocks downward about the rocking shaft 24A, and an apex of the curved portion 25 protrudes relatively from the upper surface of the flap portion 22. In linking with the upward rocking of the first flap 23, a tip of the push-up member 80 extending toward upstream from the bearing portion 23B pushes the hold-down member 70 (pressed portion 71) upward.

As shown in FIG. 12, when the cam 53 (push-up portion 53C) is further rotated counterclockwise beyond an upper dead point (position indicated by a chain line), the connecting portion 53B abuts against a supporting portion 54 to restrict and stop the rotation of the cam 55. (Although only one supporting portion 54 is illustrated in FIG. 12, the supporting portions 54 are respectively disposed on both side panels 40 to protrude inward in the width direction.)

In this state, the hold-down member 70 is supported by the upstream inclined surface of the tip of the push-up member 80 to be located at a position above the flap 22 and to extend substantially horizontally, and thus rocking of the hold-down member 70 is restricted.

When the cam 53 is stopped, the upper surface of the first flap 23 is located above the nip position between the switchback roller 50 and the pinch roller 51, and the upstream end 24B of the second flap 24 is positioned substantially at the same height as the nip position between the switchback roller 50 and the pinch roller 51. Accordingly, the upper surface of the second flap 24 inclines obliquely downward toward the nip position between the switchback roller 50 and the pinch roller 51 from the upper surface of the first flap 23, and the apex of the curved portion 25 protrudes from the upper surface of the flap portion 22 (first flap 23).

By the above operation, the flap portion 22 is located at a rock-up position shown in FIG. 12, and the ejection mode is switched from the aforementioned first ejection mode to a second ejection mode, which will be described later, and the push-down member 70 is withdrawn upward.

In addition, by rotating the cam 53 reversely, i.e., rotationally driving the cam clockwise in FIG. 12, the operation reverse to the aforementioned operation is performed in order of FIGS. 12, 11 and 10, the flap portion 22 rocks downward, and the ejection mode is switched from the second ejection mode to the first ejection mode. Concurrently, the tip of the hold-down member 70 rocks downward by its own weight, and thus is put into a state in which the hold-down member 70 can freely rock upward and downward.

<Operation at Single-Side Reading>

Figure 13:
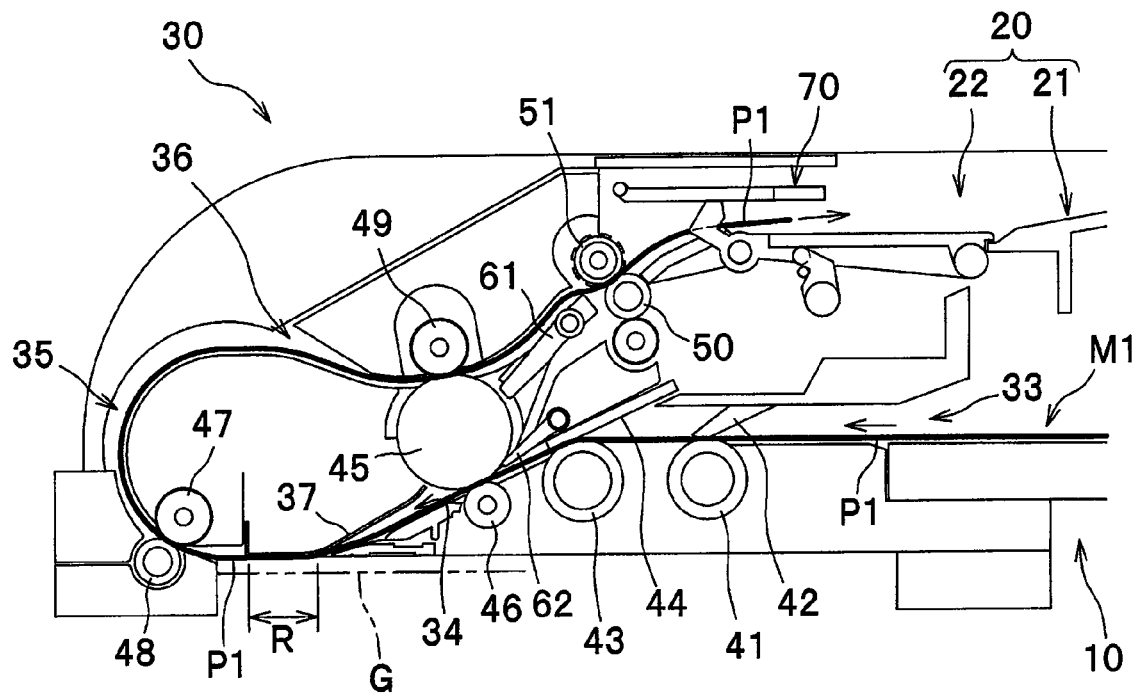
FIG. 13 is a drawing for explaining the operation at the time of single-side reading.
Figure 14:
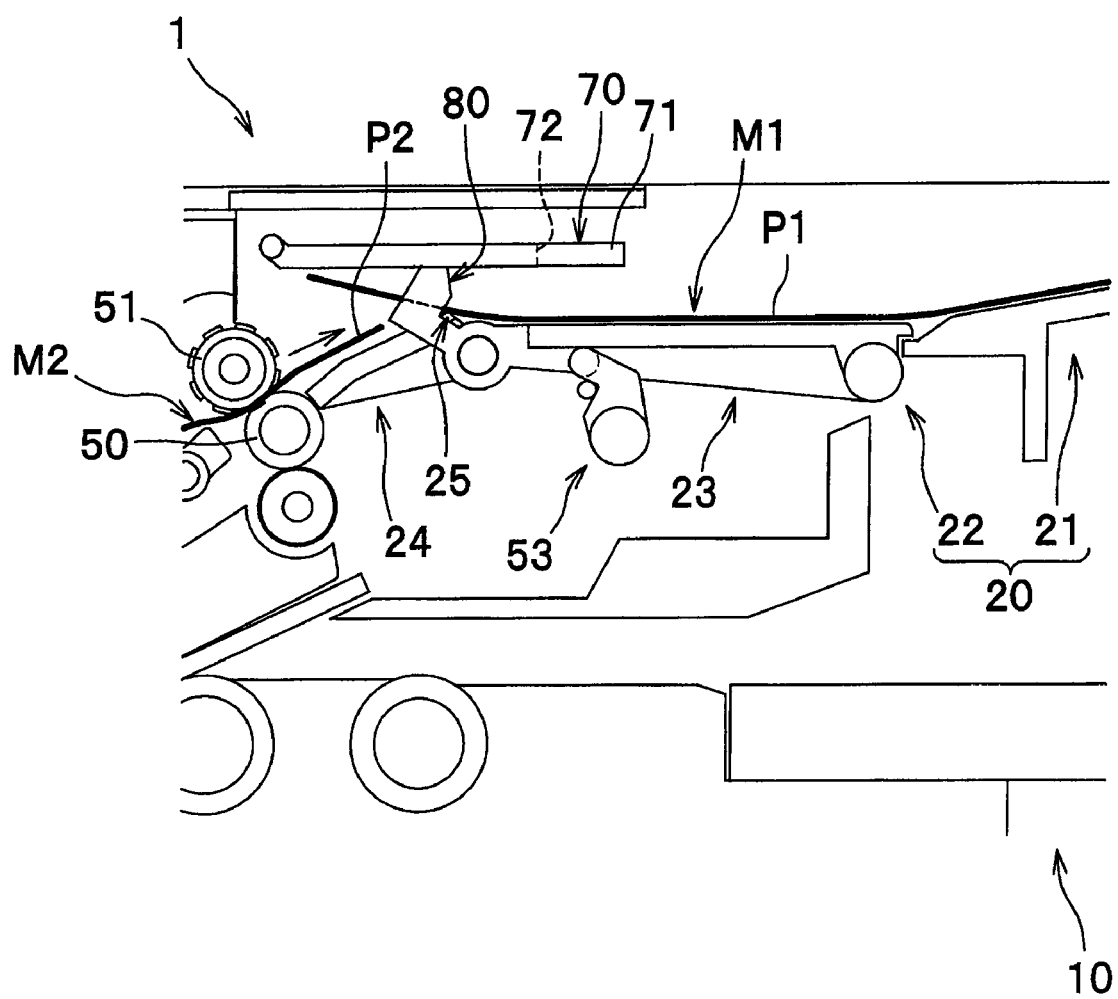
FIG. 14 is a drawing for explaining the operation in a second ejection mode.

Finally, the operation for single-side reading will be described. FIG. 13 is a drawing for explaining the operation for single-side reading, and FIG. 14 is a drawing for explaining the operation in a second ejection mode.

For single-side reading, as shown FIG. 13, the flap portion 22 is in an upwardly rocked state (that is, the flap portion 22 is located at the rock-up position). The first guide member 61 rocks downward to form part of the lower guide surface of the upper feeding path 36, and the second guide member 62 rocks upward to connect the inlet path 33 to the lower feeding path 34.

In this state, first, the document M1 of A4 size is placed on the document placing tray 10 with the reading surface P1 turned downward.

When reading is started, the document M1 is moved to the separating roller 43 by the feed-in roller 41 and the feed-in pad 42, and is further fed to the lower feeding path 34 from the inlet path 33 by the separating roller 43 and the separating pad 44.

The document M1 which has been fed to the lower feeding path 34 is fed to the reading position R with the reading surface P1 turned downward by the first feeding roller 45 and the pinch roller 46, and the reading surface P1 is read at the reading position R. Thereafter, the document M1 is fed along the curved path 35 and the upper feeding path 36 to the nip position between the switchback roller 50 and the pinch roller 51 by the rollers 47, 48, 45 and 49. Then, the document M1 is ejected to the document ejection tray 20 from the nip position between the switchback roller 50 and the pinch roller 51, with its reading surface P1 turned upward.

As shown in FIG. 14, in a state where the flap portion 22 has rocked upward, the upper surface of the first flap 23 is located above the nip position between the switchback roller 50 and the pinch roller 51, and the upper surface of the second flap 24 inclines obliquely downward toward the nip position between the switchback roller 50 and the pinch roller 51 from the upper surface of the first flap 23. Therefore, the document M1 ejected to the document ejection tray 20 is in a state where its rear end has floated from the second flap 24.

Particularly, in this embodiment, the document M1 can be supported (floated) in the vicinity of the rear end thereof by the apex of the curved path 25 which protrudes from the upper surface of the first flap 23. Thus, the rear end can be reliably floated from the second flap 24.

Accordingly, a subsequent document M2 whose single side (reading surface P2) has been read is ejected from the first nip position between the switchback roller 50 and the pinch roller 51 such that the subsequent document M2 is hidden under the previously ejected document M1.

That is, when the flap portion 22 has rocked upward, the document feeding device 1 can sequentially ejects documents in a second ejection mode where a document M1 is ejected to the document ejection tray 20 and a subsequent document M2 is ejected to be located (inserted) between the already ejected document M1 and the document ejection tray 20. Since the document M1 is ejected with the reading surface P1 turned upward and the document M2 is ejected with the reading surface P2 turned upward, the page number of the documents can be aligned in order of P1 and P2 from above. This page order is the same as the page order of the documents M1 and M2 placed on the document placing tray 10.

In a state where the flap portion 22 is in the rock-up position, the hold-down member 70 is moved to a withdrawal position above the flap portion 22 by the withdrawal mechanism (the cam 53, the flap portion 22, and the push-up member 80), and rocking of the hold-down member 70 is restricted. Thus, the hold-down member does not hold down the ejected document M1 on the document ejection tray 20. Accordingly, the subsequent document M2 is ejected under the document M1 smoothly.

That is, the withdrawal mechanism can permit the hold-down member 70 to surely hold-down a document in the first ejection mode, and can surely withdraw the hold-down member 70 in the second ejection mode. Thus, according to the withdrawal mechanism, the effect of the hold-down member 70 can be exhibited only in a desired ejection mode.

According to the document feeding device 1, the following effects can be obtained.

Since the document ejection tray 20 has the flap portion 22 which can be switched to the first ejection mode and the second ejection mode, the page number of documents to be ejected can be aligned at the time of any of single-sided reading and double-sided reading. Since a plurality of document ejection trays are not required by providing such a flap portion 22, the document feeding device 1 can be made small in the horizontal direction compared with the configuration in which two document ejection trays are provided.

Since the first reversal path 32A is configured so that the switchback roller 50 and the pinch roller 51 can eject a document to the document ejection tray 20 during switchback, it is not necessary to provide the document ejection tray 20 with an exclusive switchback path or the like. Therefore, compared with the configuration in which an exclusive switchback path is provided, the dimension of the document ejection tray 20 in the height direction and a gap between the document placing tray 10 and the document ejection tray 20 can be made small, and the document feeding device 1 can be made small in the height direction.

According to the document feeding device 1, the flap portion 22 is configured to rock downward in the first ejection mode, and the nip position (the reversing mechanism) between the switchback roller 50 and the pinch roller 52 is located above the upstream end 24B of the flap portion 22 (second flap 24) in the rock-down position. Accordingly, during double-sided reading where the reversing mechanism is used (during switchback where part of a document is ejected), a document can be reliably ejected to the document ejection tray 20.

The flap portion 22 is comprised of two parts of the first flap 23 and the second flap 24, and the upper surface of the second flap 24 is kept bent with respect to the first flap 23 so as to become substantially horizontal when the flap portion 22 is in the rock-down position. Accordingly, since the moving distance of the flap portion 22 (upstream end 24B) in the height direction can be made small compared with a flap portion which is comprised of one part, the document feeding device 1 can be made smaller in the height direction.

The length of a path along which a document is fed from the reversing mechanism (the nip position between the switchback roller 50 and the pinch roller 51) to the pair of the ejection rollers (the nip position between the sheet ejection roller 50 and the pinch roller 51) is made smaller than the length of a document of A4 size. Accordingly, since the document feeding unit 30 can be made small, the document feeding device 1 can be made smaller.

The document guides 11 and 12 have the number-of-documents limiting portions 11A and 12A which limit the number of documents, which are to be placed on the document placing tray 10, to be less than or equal to the maximum number of documents that a document temporarily ejected by the switchback roller 50 and the pinch roller 52 does not interfere with already ejected documents on the document ejection tray 20. Accordingly, in the first ejection mode, a document during switchback and a document after reading can be ejected well to the document ejection tray 20.

Assuming that the document guides 11 and 12 do not have such number-of-documents limiting portions 11A and 12A, such a larger number of documents that can be physically stacked on the document ejection tray 20 can be ejected. In this case, there is a probability that a leading end of a subsequently ejected document abuts against (interfere with) the stack of already ejected documents on the document ejection tray 20, and thus, bending may occur or paper jamming caused by the bending may occur. Accordingly, since such interference can be suppressed by providing the number-of-documents limiting portions 11A and 12A, a document during switchback and a document after reading can be ejected well to the document ejection tray 20.

Similarly, a document after reading in the second ejection mode can be ejected well to the document ejection tray 20 by providing the number-of-documents limiting portions 11A and 12A to limit the number of documents to be ejected to the document ejection tray 20. That is, in the second ejection mode, a subsequent document is sequentially fed under a document already ejected on the document ejection tray 20. Thus, if the number (weight) of already ejected documents increases excessively, a subsequently ejected document is hard to enter under the already ejected documents. This also causes bending or paper jamming.

The document feeding device 1 includes the hold-down member 70 which holds down a document ejected in the first ejection mode, and the reversing mechanism (the cam 53, the flap portion 22, and the push-up member 80) which withdraws the hold-down member 70 upward in the second ejection mode. Accordingly, in the first ejection mode, bending of a document, or paper jamming can be suppressed. Further, in the first ejection mode, a document can be ejected not to enter under an already ejected document, and thus page order is not disturbed. In the second ejection mode, the hold-down member 70 does not become an obstacle, and thus a document can be ejected to enter under an already ejected document.

According to the document feeding device 1, since a document is fed to the reading position R in a direction from the middle of the platen glass G toward the end thereof (in a direction from right to left in FIG. 3), the platen glass G of the document reading device (reading glass) can be comprised of one platen glass, and the document feeding device 1 can be made small in the horizontal direction.

Assuming that a document is fed in an opposite direction (in a direction from left to right in FIG. 3) in the configuration shown in FIG. 3, the document will enter between the platen glass G and the document feeding device 1, and the document cannot be fed to the document ejection tray (document placing tray 10 in FIG. 3) which is arranged at the upper right of the reading position.

Therefore, generally, when a document is fed in a direction opposite to that of the document feeding device 1 in the configuration shown in FIG. 3, a platen glass is split at the right side of the reading position R so that one piece of the platen glass is for the reading position and the other piece of the platen glass is for a reading surface of, for example, a flatbed scanner. Further, a guide member for guiding the document is disposed between the two pieces of the platen glass. The guide member has a lower end lower in height than the upper surface of the one piece of the platen glass, and also has an inclined surface which inclines obliquely upward to the right from the lower end. With this arrangement, a document can be fed to the document ejection tray, arranged on the upper right, without entering between the other piece of the platen glass and the document feeding device. However, since the other pieces of the platen glass is in general used as the reading surface of the flatbed scanner, its length (or width) needs to be the same as at least the length (or width) of a document of a largest size to be placed.

In contrast, in a case where a document is fed to the reading position R in a direction from the middle of the platen glass G toward the end thereof like the document feeding device 1, the platen glass can be comprised of one platen glass G having the same length (or width) as the other piece of the platen glass. Thus, it is possible to make horizontal dimensions small by a length corresponding to the sum of the one piece of the platen glass and a region where the guide member is disposed. Accordingly, the document feeding device 1 can be made small in the horizontal direction.

Although the embodiment of the invention has been described above, the invention is not limited to the aforementioned embodiment. Specific configurations can be properly altered without departing from the sprit or scope of the invention.

Although the aforementioned embodiment has shown the configuration in which the document guides 11 and 12 are provided with the number-of-documents limiting portions 11A and 12A, the invention is not limited thereto. For example, the document placing tray may be formed in a tubular shape, an upper surface of a lower wall thereof may be used as a placing surface, and a lower surface of an upper wall thereof may be used as a number-of-documents limiting portion. Alternatively, a lower surface of the document ejection tray may be used as a number-of-documents limiting portion. Alternatively, the control device may be used as a number-of-documents limiting portion. Specifically, the control device may be configured to count the number of read documents which have been read is counted and to stop reading operating when the counted number of read documents reaches a maximum number of documents that a document temporarily ejected by the reversing mechanism does not interfere with already ejected documents on the document ejection tray 20. The control device may further be configured to start reading operation again when a sensor detects that a document is removed from the document ejection tray. In addition, the document feeding device according to the invention may not include the document guides.

Although the aforementioned embodiment has shown the configuration in which the hold-down member 70 rocks downward due to its own weight to hold down a trailing end of a document, the invention is not limited thereto. For example, the hold-down member rockable up and down may be constantly biased downward by a biasing member. In this case, the biasing force of the biasing member is set to such a degree that the hold-down member can smoothly rock when a document is ejected to press the hold-down member by a leading end thereof.

Although the aforementioned embodiment has shown the configuration in which the withdrawal mechanism which withdraws the hold-down member 70 includes the cam 53, the flap portion 22, and the push-up member 80, the invention is not limited thereto. For example, a gear mechanism may be used as the withdrawal mechanism. That is, for example, the flap portion is arranged to rock up and down by a driving force transmitted to a rotary shaft of the flap portion from a driving source, and the drive force transmitted to the rotary shaft of the flap portion is further transmitted through the gear mechanism to a rocking shaft of the hold-down member. Alternatively, the withdrawal mechanism may include a driving source provided separately from a driving source provided for the flap portion, and a gear mechanism for transmit the driving force of the separately provided driving source to the push-up member 70. In the case of these alternatives, the hold-down member can be provided inside the width of a document. In addition, when a driving source is provided separately, the hold-down member can be withdrawn in the second ejection mode by control of the control device.

Moreover, the withdrawal mechanism may include the flap portion and a retractable member whose tip can protrude or retract in linking with the upward or downward rocking of the flap portion. Such a retractable member may be provided at the upper surface or side surface of the flap portion outside the width of a document.

Although the aforementioned embodiment has shown the configuration in which the flap portion 22 is comprised of two parts of the first flap 23 and the second flap 24, and the upper surface of the second flap 24 is substantially horizontal when the flap portion 22 is the rock-down position. However, the invention may not be limited thereto. For example, the flap portion may be configured such that the upper surface of the second flap has an inclination gentler than the upper surface of the first flap when the flap portion is in the rock-down position (when the second flap rocks with respect to the first flap). Alternatively, the flap portion may be comprised of one part (one flap), and may be comprised of three or more parts (three or more flaps).

Although the aforementioned embodiment has shown the configuration in which the length of a path along which a document is fed from the reversing mechanism (the nip position between the switchback roller 50 and the pinch roller 52) to the pair of ejection rollers (the nip position between the switchback roller 50 and the pinch roller 51) is smaller than the length of a document of A4 size, the invention is not limited thereto. That is, the length of a path along which a document is fed from the reversing mechanism to the pair of ejection rollers may be equal to the length of a document of A4 size, or may be greater than the length of a document of A4 size. Additionally, a reference size of a document is not limited to A4 size, and may be, for example, A3 size, B4 size, letter size, legal size, or the like.

Although the aforementioned embodiment has shown the configuration in which the reversing mechanism and the pair of ejection rollers are provided in proximity to each other because the switchback roller 50 serves as a driving roller for both the reversing mechanism and the pair of ejection rollers, the invention is not limited thereto. That is, the reversing mechanism and the pair of ejection rollers (ejection mechanism) may be provided separately. In addition, as in the aforementioned embodiment, the document feeding device 1 can be made small in the height direction by providing the reversing mechanism and the pair of ejection roller in proximity to each other.

The configuration of the feeding mechanism shown in the aforementioned embodiment is an example, and the invention is not limited thereto. For example, the number or arrangement of the respective rollers can be changed properly. Additionally, a roller can also be adopted instead of each pad. That is, as for the feeding mechanism and the reversing mechanism, their configurations or members to be adopted may be properly changed without departing the spirit or scope of the invention.

The configuration of the feeding path 31 and the reversal path 32 (the first reversal path 32A and the second reversal path 32B) which are shown in the aforementioned embodiment is an example, and the invention is not limited thereto. That is, the configuration of the feeding path and the reversal path can be properly changed depending on the positional relationship between the document placing tray and the document ejection tray (flap portion) or the shape, size, etc. of the document feeding unit.

What is claimed is:

1. A document feeding device comprising:
   a document placing tray;
   a document ejection tray disposed above the document placing tray;
   a feeding path extending from the document placing tray through a reading position to the document ejection tray,
   a first reversal path which branches from the feeding path at a position downstream of the reading position, and which is configured to guide a document toward the document ejection tray;
   a second reversal path which branches from the first reversal path, which is connected to the feeding path at a position upstream of the reading position and which is configured to guide the document from the first reversal path to the reading position; and
   a reversing mechanism which is arranged in the first reversal path, and which is configured to temporarily eject part of the document from the first reversal path to the document ejection tray, and feed the document from the first reversal path to the second reversal path,
   wherein the document ejection tray has a flap portion which is arranged in an upstream side of the document ejection tray, and which is configured to rock up and down to provide a first mode and a second mode,
   wherein in the first mode a first ejected document is placed on the document tray and a second ejected document subsequently from the first ejected document is stacked on the first document, and
   wherein in the second mode a third ejected document is placed on the document ejection tray and a fourth ejected document subsequently from the third ejected document is inserted between the third ejected document and the document ejection tray.

2. The document feeding device according to claim 1,
   wherein the flap portion is configured to rock down to a rock-down position to provide the first mode, and
   the reversing mechanism is located above an upstream end of the flap portion in the rock-down position.

3. The document feeding device according to claim 1,
   wherein the document placing tray has protruded document guides configured to restrict documents placed on the document placing tray in a width direction, and
   wherein the document guides have a number-of-documents limiting portions which extend inward in the width direction, and which are configured to limit a number of documents on the document placing tray to be less than or equal to a predetermined number.

4. The document feeding device according to claim 1, further comprising:
   a hold-down member which is rockable up and down above the flap portion, and which is configured to rock down to hold down a document on the document ejection tray in the first mode, and
   a withdrawal mechanism which is configured to move the hold-down member to rock up, thereby withdrawing the hold-down member in the second mode.

5. The document feeding device according to claim 1,
   wherein the flap portion has a first flap and a second flap attached to an upstream portion of the first flap so that the second flap is rockable with respect to the first flap, and
   an upper surface of the second flap has an inclination gentler than an upper surface of the first flap when the flap portion is rocked down.

6. The document feeding device according to claim 1, further comprising:
   an ejection roller which is arranged in the feeding path and which is configured to eject the document to the document ejection tray,
   wherein a length of a path along which the document is fed from the reversing mechanism to the ejection roller is smaller than a length of a document of A4 size.

* * * * *